United States Patent
Wang et al.

(10) Patent No.: US 6,620,368 B1
(45) Date of Patent: Sep. 16, 2003

(54) SOL-GEL PROCESS FOR PRODUCTION OF OXIDE-BASED GLASS AND CERAMIC ARTICLES

(75) Inventors: Shi-Ho Wang, Lake Forest, CA (US); Chih-Hsing Cheng, Fullerton, CA (US); Sharon Doh, Aliso Viejo, CA (US)

(73) Assignee: Simax Technologies, Inc., Irvine, CA (US)

( * ) Notice: Subject to any disclaimer, the term of this patent is extended or adjusted under 35 U.S.C. 154(b) by 0 days.

(21) Appl. No.: 09/615,628

(22) Filed: Jul. 13, 2000

(51) Int. Cl.$^7$ ............................................. C04B 35/624
(52) U.S. Cl. ........................ 264/344; 65/17.2; 264/621; 501/12; 34/497
(58) Field of Search .......................... 65/17.2; 264/621, 264/344, 342 R; 501/12; 34/497

(56) References Cited

U.S. PATENT DOCUMENTS

| | | | |
|---|---|---|---|
| 3,850,971 A | | 11/1974 | Termin et al. |
| 4,317,668 A | * | 3/1982 | Susa .......................... 65/17.2 |
| 4,323,381 A | * | 4/1982 | Matsuyama ................. 65/395 |
| 4,477,580 A | | 10/1984 | Fleming, Jr. |
| 4,681,615 A | * | 7/1987 | Toki et al. ..................... 501/12 |
| 4,849,378 A | | 7/1989 | Hench et al. |
| 4,851,373 A | | 7/1989 | Hench et al. |
| 5,023,208 A | | 6/1991 | Pope et al. |
| 5,071,674 A | | 12/1991 | Nogues et al. |
| 5,076,980 A | | 12/1991 | Nogues et al. ................. 501/12 |
| 5,196,382 A | | 3/1993 | Hench et al. |
| 5,243,769 A | | 9/1993 | Wang et al. |
| 5,264,197 A | | 11/1993 | Wang et al. |
| 5,343,633 A | | 9/1994 | Wang et al. |

OTHER PUBLICATIONS

Brinker & Scherer, "Sol–Gel Science, The Physics and Chemistry of Sol–Gel Processing," Academic Press, 1990, pp. 483–498.

Kirkbir et al., "Parametric study of strength of silica gels," Journal Non–Crystalline Solids, vol. 178, 1994, pp. 284–292.

* cited by examiner

*Primary Examiner*—James Derrington
(74) *Attorney, Agent, or Firm*—Knobbe, Martens, Olson & Bear, LLP

(57) ABSTRACT

A process which uses sol-gel to process oxide-based monoliths which are virtually free of cracks, without nullifying the desired attributes of the oxide-based monoliths. The method comprises substantially drying a wet porous gel monolith by removing a portion of the liquid from the pores of the gel monolith while the gel monolith remains wet, shrinking in size, and becoming correspondingly more dense, then removing the remaining portion of the liquid from the pores of the gel monolith such that the outer region of the gel monolith is not dried before the inner region of the gel monolith is dried. The gel monolith is substantially dried under conditions in which the liquid evaporation rate is no greater than the pore liquid diffusion rate.

31 Claims, 3 Drawing Sheets

SOL-GEL PROCESS FOR PRODUCTION OF OXIDE-BASED GLASS AND CERAMIC ARTICLES

BACKGROUND OF THE INVENTION

1. Field of the Invention

This invention relates to a sol-gel process for processing gel monoliths for use in fabricating oxide-based glasses and ceramics with controlled properties (e.g., chemical purity, homogeneity) compatible with a variety of applications, including high-performance optics.

2. Description of the Related Art

High-performance oxide-based materials are increasingly in demand for use in a variety of applications. For example, silica glass has the optical transmittance, mechanical hardness, chemical durability, thermal stability, low thermal expansion, and high laser damage threshold which make it an optimal material for applications such as optoelectronic laser diodes, fiber optic telecommunications, medical laser delivery systems, and military optical sensors. There is significant pressure on material manufacturers to find fabrication techniques which can satisfy the increasingly stringent performance requirements for silica glass and other oxide-based materials.

Numerous techniques are currently in use for the fabrication of oxide-based glasses or ceramics. For example, silica glasses have traditionally been manufactured by melting natural quartz or synthetic silica in crucibles at high temperatures (typically about 1700° C.–2000° C.). However, the resultant materials have limited utility for various optical applications, primarily due to structural inhomogeneities as well as impurity concentrations (e.g., from intrinsic impurities in the raw materials, incomplete chemical reactions of components, and contamination by the crucible). Such high-temperature processes are also incompatible with manufacturing products with certain compositions, tailored dopant or additive gradients, organic or high vapor pressure additives, or additives in their metallic or partially reduced states.

Another more recent technique for manufacturing silica glasses has been chemical vapor deposition (CVD), in which silicon-containing chemical vapors are combined with oxygen under high temperature conditions to deposit silica onto a substrate. However, the resultant materials are relatively expensive due to low material collection efficiencies, slow processing rates, and complex processing and pollution control equipment. Furthermore, CVD processes lack the versatility for fabricating more compositionally complex glasses.

Sol-gel technology has been identified as possibly being able to fabricate products which satisfy some or all of the desired performance requirements without the difficulties or limitations found in more conventional fabrication techniques. A typical sol-gel silica process involves the transition of a liquid colloidal solution "sol" phase into a solid porous "gel" phase, followed by drying and sintering the resulting gel monolith at elevated temperatures to form silica glass. One method of preparing a silica porous gel monolith is to pour into a mold a solution of silica-forming compounds (e.g., silicon alkoxides and tetraethyl orthosilicate (TEOS)), solvents, and catalysts, which then undergoes hydrolysis and polymerization, resulting in a wet porous gel monolith or matrix. After drying the wet gel monolith in a controlled environment to remove the fluid from the pores, the dry gel monolith is densified into a solid glass-phase monolith.

Sol-gel technology can yield products with the desired chemical purity, homogeneity, and flexibility in compositions, dopants, and dopant profiles. However, the potential for sol-gel processes for fabricating large monoliths has been limited by various problems. Large gel monoliths can take a long time to dry, thereby limiting the product throughput. But even more importantly, shrinkage of the gel monolith during the drying process often results in cracking, especially in larger gel monoliths.

SUMMARY OF THE INVENTION

The present invention provides a method of using sol-gel technology to process oxide-based monoliths.

One aspect of the present invention is a method of processing an oxide-based gel monolith having pores filled with liquid, an inner region, and an outer region. The method comprises drying the gel monolith such that the outer region is not dried before the inner region.

Another aspect of the present invention is a method for processing an oxide-based gel monolith comprising pores filled with liquid, an inner region, and an outer region. The method comprises substantially drying the gel monolith by drawing liquid from a surface of the gel monolith at a rate greater than the pore liquid diffusion rate and then decreasing the rate of drawing liquid from the surface to less than or approximately equal to the pore liquid diffusion rate, such that the outer region of the gel monolith is not dried before the inner region of the gel monolith is dried. The substantially dried gel monolith is sintered, whereby the gel monolith is further densified and is transformed into a glass or ceramic phase material.

Another aspect of the present invention is a method for processing an oxide-based gel monolith of an initial volume, wherein the gel monolith comprises pores filled with liquid. The method comprises removing liquid from the gel monolith at a first relatively rapid rate until the volume of the gel monolith reaches a predetermined first percentage of the initial volume, and subsequently removing liquid from the gel monolith at a second rate, substantially lower than the first rate, until the gel monolith reaches a second percentage of the initial volume less than said first percentage of the initial volume.

Another aspect of the present invention is a method for processing an oxide-based wet porous gel monolith having an inner region including the center of the gel monolith, and an outer region including the surface of the gel monolith. The method comprises substantially drying the gel monolith by exposing the gel monolith to conditions in which white, opaque features are exhibited in the inner region of the gel monolith before white, opaque features are exhibited in the outer region of the gel monolith.

Another aspect of the present invention is a method for processing an oxide-based gel monolith comprising pores filled with liquid. The method comprises placing the gel monolith in a drying oven, and subjecting the gel monolith to a drying treatment comprising heating said gel monolith in the drying oven without controlling the humidity of the atmosphere within the drying oven.

Yet another aspect of the present invention is a method for processing an oxide-based gel monolith comprising pores filled with liquid. The method comprises placing the gel monolith in a drying oven, and subjecting the gel monolith to a drying treatment comprising only heating said gel monolith in the drying oven.

BRIEF DESCRIPTION OF THE DRAWINGS

These and other aspects of the invention will be apparent to the skilled artisan from the following detailed description read in conjunction with the appended drawings, which are meant to illustrate, and not to limit, the invention, and in which.

DETAILED DESCRIPTION OF THE PREFERRED EMBODIMENT

The preferred methods disclosed herein form silica-based gel monoliths which are virtually free of cracks. Persons skilled in the art recognize, however, that the methods and structures disclosed herein will have application to the formation of other oxide-based gel monoliths generally.

During the drying of a large gel monolith, the gel monolith shrinks in size, and capillary forces in the gel pores arise as the liquid content of the gel monolith is reduced. If the drying of the gel monolith progresses too quickly in one region of the gel monolith as compared to another region, then inhomogeneities in the capillary forces create stresses in the gel monolith, thereby causing cracks. Typically, cracking of the gel monolith is observed when the outer regions of the gel monolith dry before the inner regions of the gel monolith. If the drying of the gel monolith progresses too slowly, then the fabrication process takes longer than is economically desirable. In the preferred process, the drying rate of the gel monolith is selected to avoid cracking by minimizing inhomogeneities in the capillary forces during the drying of the gel monolith.

To avoid the outer regions of the gel monolith from drying before the inner regions, the preferred process exposes the wet gel monolith to conditions in which the rate of evaporation $\theta_{evap}$ is substantially equal to or less than the rate of diffusion $\theta_{diff}$ of liquid through the pores of the gel monolith. The rate of diffusion $\theta_{diff}$ is the rate at which pore liquid is driven toward the gel surface by intermolecular forces associated with the surface tension of the pore liquid within the gel monolith. Values of $\theta_{evap}$ and $\theta_{diff}$ which are more probable to result in inhomogeneous capillary forces and cracking of the gel monolith are schematically represented by the unhatched area of FIG. 1. Accordingly, in the preferred process, the gel monolith is exposed to temperatures which result in an evaporation rate $\theta_{evap}$ and a diffusion rate $\theta_{diff}$ within the hatched area, including the line of $\theta_{evap}=\theta_{diff}$, of FIG. 1. Under such conditions, liquid diffuses through the pores of the gel monolith from the inner regions toward the surface, where it is removed from the gel monolith by evaporation. Because the evaporation rate $\theta_{evap}$ is approximately equal to or lower than the diffusion rate $\theta_{diff}$, the liquid which evaporates from the gel monolith's surface is replaced by liquid from the inner region of the gel monolith. Therefore, the outer region of the gel monolith does not dry before the inner region of the gel monolith, which would cause inhomogeneous capillary forces and cracking. In this way, the gel monolith is effectively dried from the inside out.

Figure 2:
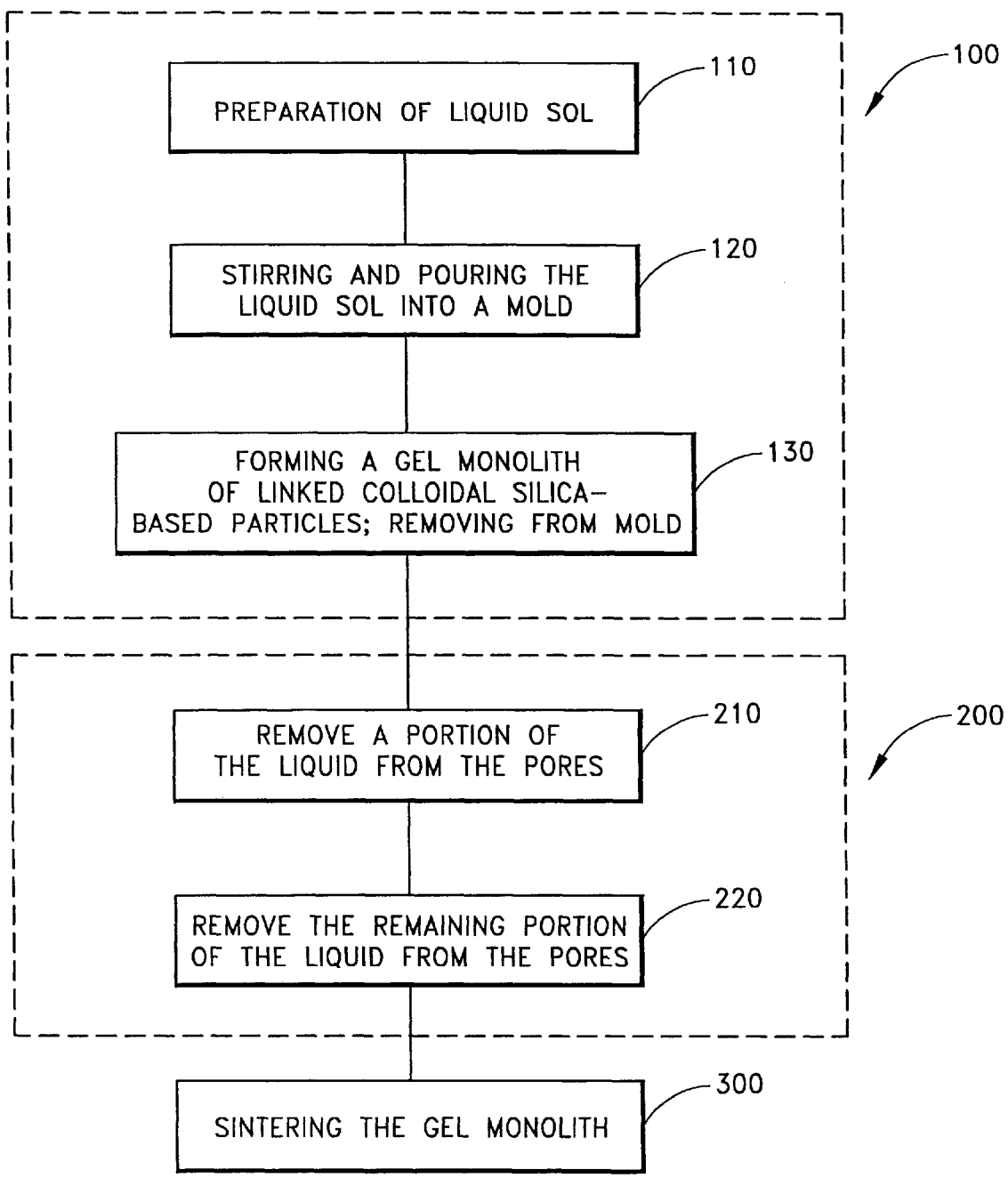
FIG. 2 is a block flowchart illustrating the general steps of one embodiment of the present method for processing an oxide-based gel monolith.

A preferred method, schematically illustrated in FIG. 2, begins by forming 100 a wet porous gel monolith comprising an inner region including the center of the gel monolith, an outer region including the surface of the gel monolith, and pores filled with liquid. The gel monolith is substantially dried 200, wherein a portion of the liquid is removed 210 from the pores of the gel monolith while the gel monolith remains wet and shrinks in size, becoming correspondingly more dense, and the remaining portion of the liquid is removed 220 from the pores of the gel monolith such that the outer region of the gel monolith is not dried before the inner region of the gel monolith is dried.

The formation 100 of a wet porous gel monolith comprises preparing 110 a liquid sol by mixing together organometallic compounds, such as metal alkoxides, with solvents and catalysts in predetermined proportions. Suitable metal alkoxide materials include, but are not limited to tetramethylorthosilicate (TMOS) and tetraethylorthosilicate (TEOS). Solvents compatible with the present invention include, but are not limited to, ethanol and other alcohols, and suitable catalysts include, but are not limited to, hydrochloric acid (HCl) and hydrofluoric acid (HF). Alternatively, the liquid sol is prepared by mixing together inorganic metal salts and water, which form a colloidal dispersion.

The formation 100 of the wet porous gel monolith also comprises stirring and pouring 120 the liquid sol into a mold. Colloidal silica-based particles are formed 130 by hydrolysis and polymerization reactions, with the colloidal particles linking together, thereby forming 100 a wet porous silica gel monolith or matrix with pores filled with liquid. In certain embodiments, the wet porous silica gel monolith is not removed from the mold for a number of days, but is stored at substantially room temperature while remaining in the mold until the fabrication process continues.

The microstructure (e.g., pore size, surface area, volume, and distribution) of the resulting porous gel monolith significantly affects the ability of the porous gel monolith to withstand the capillary forces during the drying process and the ability to subsequently introduce desired dopants or additives to the porous gel monolith to tailor its properties. This microstructure is dependent on the relative concentrations of the solvents and the catalysts, and can be varied within a wide range by persons skilled in the art by judicious selection of process parameters. In certain embodiments, drying control chemical additives ("DCCA") are added to the sol to control its hydrolysis and polymerization rates so as to tailor the pore sizes and distributions. The time required for formation 100 of the wet porous gel monolith is dependent on the sol composition and the type of catalysts used. In certain embodiments, after formation 100 of the wet porous gel monolith, the pore liquid may be replaced with ethanol by removing the gel monolith from the mold and submerging it in pure ethanol while at elevated temperatures (e.g., approximately 60° C.–70° C.). Persons skilled in the art are able to select the appropriate process parameters and procedures to form 100 the wet porous gel monolith compatible with the present invention.

The preferred method of processing an oxide-based gel monolith illustrated in FIG. 2 continues with the substantially drying 200 of the gel monolith. In a first stage of liquid removal 210, liquid is driven out of the pores of the gel monolith, while the gel monolith remains wet and shrinks in size, becoming correspondingly more dense. In a second stage of liquid removal 220, the liquid content of the gel monolith is reduced under conditions so that the gel monolith effectively dries from the inside out. While the preferred process is described herein as comprising two stages, persons skilled in the art will recognize that the removal of liquid may also be performed in one stage, or more than two stages, without varying from the scope of the present invention.

Figure 3:
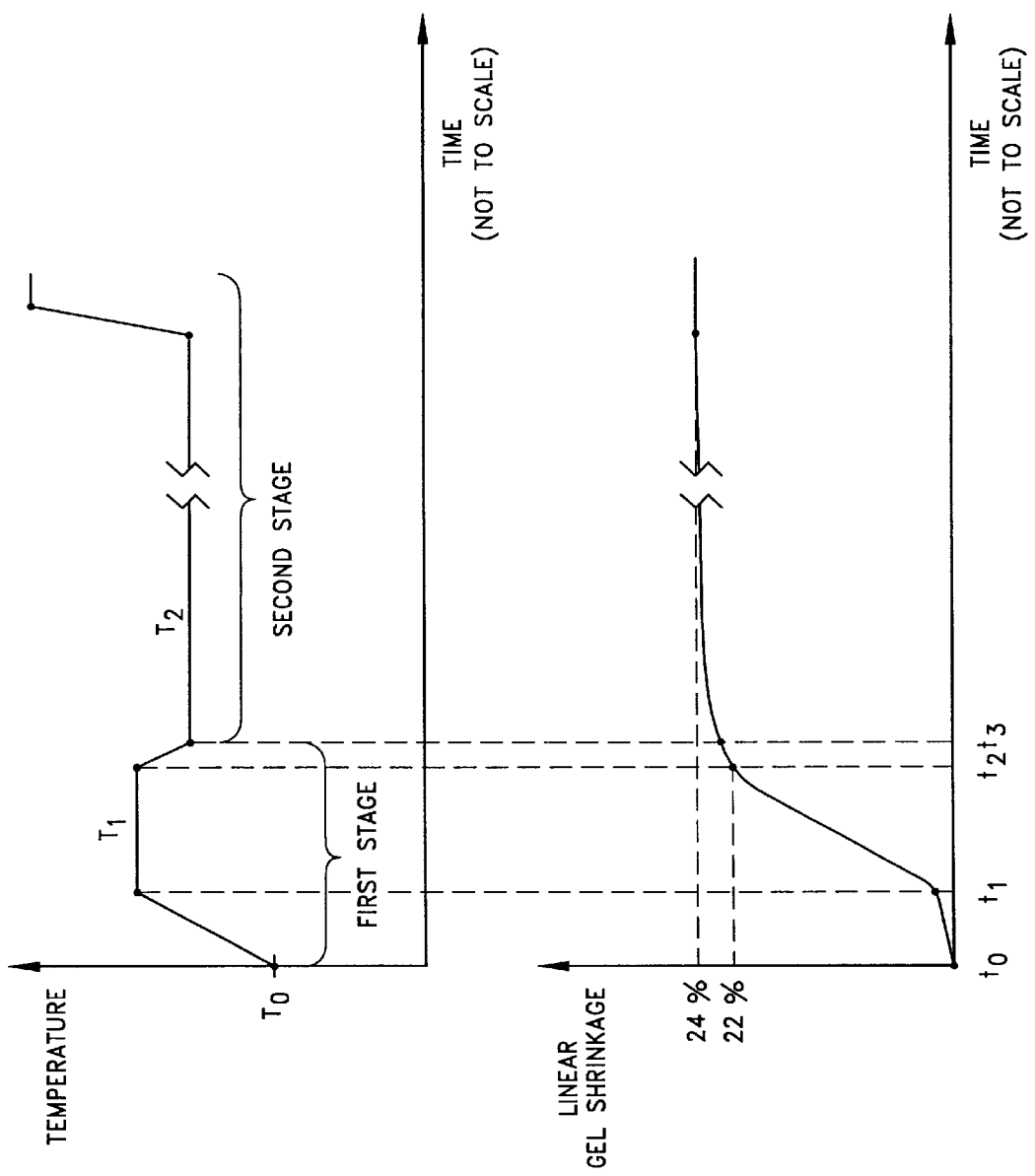
FIG. 3 is a graph illustrating the temporal temperature profile, and the corresponding linear gel shrinkage for one embodiment of the present method.

The first stage of liquid removal 210 of the preferred process is accomplished by removing the wet porous gel monolith from the mold, and exposing the wet gel monolith to conditions that provide an increased pore liquid evaporation rate $\theta_{evap}$. In the exemplary process illustrated in FIG. 3, the pore liquid evaporation rate $\theta_{evap}$ is increased by placing the wet porous gel monolith in a drying oven to controllably adjust the temperature applied to the wet porous gel monolith. A temporal temperature profile for the first stage of liquid removal 210 comprises a set of elevated temperatures, as illustrated in FIG. 3. In the illustrated process, this set of elevated temperatures comprises an increase of the temperature from an initial temperature $T_o$ (typically room temperature) at time $t_0$, eventually reaching an elevated temperature $T_1$ at time t1. The elevated temperature $T_1$ is preferably between about 0° C. and 20° C. above the boiling temperature of the pore liquid, more preferably between about 3° C. and 15° C. above the boiling temperature of the pore liquid, and most preferably between about 5° C. and 10° C. above the boiling temperature of the pore liquid. The rate of temperature increase from $T_0$ to $T_1$ is preferably between about 0.2 and 10° C./hour, more preferably between about 0.5 and 5° C./hour, and most preferably between about 0.5 and 1.5° C./hour.

The first stage of liquid removal 210 results in the shrinkage or decrease of the volume of the wet porous gel monolith. The dimensional change of the wet porous gel monolith is closely correlated with the amount of liquid removed from the gel monolith. In addition, since it is only the mass of a portion of the pore liquid which is removed, the mass of the gel monolith itself remains substantially constant throughout the first stage of liquid removal 210. Therefore, the density of the gel monolith increases during the first stage of liquid removal 210, and the dimensional or linear gel shrinkage provides a measure of the changing density of the gel monolith. For example, a linear gel shrinkage of 10% (i.e., to 90% of its original size) corresponds to an increase in the density of the gel monolith of approximately 37%. As illustrated in FIG. 3, beginning from a linear gel shrinkage defined to be 0% at time $t_0$, the gel monolith shrinks by some amount during the period of increasing temperature between times $t_0$ and $t_1$. The shrinkage of the wet porous gel monolith then continues as the gel monolith is held at the elevated temperature $T_1$.

As liquid is removed from the pores of the gel monolith, the gel monolith shrinks in size yet remains wet, until the density of the gel monolith reaches its critical gel density $\rho_{crit}$, past which there is no further shrinkage due to liquid removal. Further removal of liquid from regions of the gel monolith which have reached the critical gel density $\rho_{crit}$ results in the drying of those regions. The actual critical gel density $\rho_{crit}$ for a particular gel monolith is a function of various factors, including, but not limited to its chemical composition, catalysts, and the temporal temperature profile used during the liquid removal. For the preferred gel monoliths described herein, the critical gel density $\rho_{crit}$ corresponds to a gel monolith linear shrinkage of approximately 24%.

Exposing the wet porous gel monolith to the elevated temperatures during the first stage of the liquid removal 210 increases the rate of evaporation $\theta_{evap}$ of liquid from the gel monolith, thereby requiring less time to approach the critical gel density $\rho_{crit}$, and reducing the overall time required for fabrication of the oxide-based glass or ceramic. In addition, the gel monolith's microstructure is dependent on the temporal temperature profile used to drive off the pore liquid. In the preferred process, the gel monolith pore radius size at the conclusion of the first stage of liquid removal 210 is preferably between about 20 and 800 Å, more preferably between about 100 and 800 Å, and most preferably between about 200 and 800 Å.

In the exemplary process illustrated in FIG. 3, the temperature is linearly reduced toward the end of the first stage of liquid removal 210, until reaching $T_2$ at a time $t_3$. Such adjustment of the temperature is performed when the gel monolith has reached a selected gel density which is close to, but less than the critical gel density $\rho_{crit}$ of the gel monolith. The selected gel density corresponding to the end of the first stage of liquid removal 210 for a particular gel monolith is a function of various factors including, but not limited to, its chemical composition, catalysts, geometry (e.g., surface area to volume ratio), and the temporal temperature profile used. The selected gel, density indicating the end of the first stage of liquid removal 210 of the preferred process corresponds to a linear gel shrinkage of preferably between about 15% and 35%, more preferably between about 20% and 30%, and most preferably between about 22% and 27%. In the exemplary process illustrated in FIG. 3, the selected gel density corresponding to a linear gel shrinkage of approximately 22% is reached after approximately 4 to 6 days of the first stage of liquid removal 210.

In the preferred process, the temperature $T_2$ is preferably between about 10° C. below and 10° C. above the boiling temperature of the pore liquid, more preferably between about 5° C. below and 5° C. above the boiling temperature of the pore liquid, and most preferably between about 0 and 2° C. above the boiling temperature of the pore liquid. Additionally, the linear rate of temperature decrease from $T_1$ to $T_2$ of the preferred process is preferably between about 1 and 10° C./hour, more preferably between about 2 and 8° C./hour, and most preferably between about 3 and 6° C./hour.

During the second stage of liquid removal 220 of a preferred process, beginning at time $t_3$, the gel monolith shrinks slightly (until the critical gel density $\rho_{crit}$ is reached), and the liquid content of the gel monolith is reduced, thereby drying the gel monolith. In the preferred process, the temperature $T_2$ is selected to provide a rate of gel monolith drying which minimizes inhomogeneities in the capillary forces and avoids cracking the gel monolith. To avoid the outer regions of the gel monolith from drying before the inner regions, the temperature $T_2$ results in a rate of evaporation $\theta_{evap}$ that is substantially equal to or less than the rate of diffusion $\theta_{diff}$ of liquid through the pores of the gel monolith, as illustrated schematically in FIG. 1. Under such conditions, the liquid which evaporates from the gel monolith's surface is replaced by liquid from the inner region of the gel monolith, effectively drying the gel monolith from the inside out.

In the preferred process, the gel density is measured by monitoring the amount of linear gel shrinkage, as illustrated in FIG. 3. Alternatively, rather than measuring the gel density by continually monitoring the gel monolith linear shrinkage to detect the selected gel density, the weight of the pore liquid removed from the wet porous gel monolith is monitored. In certain processes, the weight of the removed pore liquid is monitored by collecting the evaporated pore liquid from the oven, re-condensing the pore liquid, and weighing the resultant condensate. The evaporated pore liquid is collected via a piping system which provides a conduit for heated vapor from the oven to reach a container on a weight scale. Since the atmosphere in the oven is saturated with vapor from the pore liquid, upon entering the piping system and the container, which are at approximately room temperature, the vapor cools, re-condenses, and flows into the container to be weighed.

After first empirically determining the weight of the collected condensate corresponding to the selected gel density for a gel monolith of a particular geometry and composition, the weight of the collected condensate provides a measure of the gel density. Expressed as a percentage of the weight of the initial wet porous gel monolith, the weight of the condensate from the evaporated pore liquid corresponding to the selected gel density is preferably between about 40% and 55%, more preferably between about 40% and 50%, and most preferably between about 44% and 50%.

In addition to monitoring the gel monolith shrinkage or condensate weight, visual examination of the gel monolith can be used to monitor the gel monolith. In a preferred process, the wet porous gel monolith has a clear, slightly bluish appearance from the time to at which the temperature begins to increase, to the time at which the gel monolith reaches its critical gel density $\rho_{crit}$. This appearance is indicative of a homogeneous gel monolith with pores sizes in the range of 200 to 800 Å. Further exposure to the elevated temperature $T_1$ of the gel monolith beyond its critical gel density $\rho_{crit}$ causes the outer regions of the gel monolith to dry out more quickly than the inner regions, resulting in larger pore sizes near the surface of the gel monolith as compared to the inner regions of the gel monolith. This inhomogeneity of pore sizes would then be evident by white, opaque features appearing at the surface of the gel monolith, while the center of the gel monolith would remain relatively clear. Therefore, in a preferred process, the first stage of liquid removal 210 is substantially completed before the outer surface of the gel monolith exhibits these white features indicative of excessive drying.

In the exemplary process illustrated in FIG. 3, the temperature $T_2$ of the second stage of liquid removal 220 is slowly ramped up from the time $t_3$ to the time when the gel monolith is substantially dried. The linear rate of temperature increase of $T_2$ is preferably between about 0.3 and 20 days/° C., more preferably between about 1 and 10 days/° C., and most preferably between about 2 and 5 days/° C.

Visual monitoring of the gel monolith during the second stage of liquid removal 220 provides information on the progress of its drying. As described above, in the preferred process, at time $t_3$ the gel monolith still has a clear, slightly bluish appearance, indicative of a homogeneous gel. As the second stage of liquid removal 220 progresses, the inner regions of the gel monolith begins to exhibit white, opaque features indicative of dried regions, while the outer regions remain clear. After further exposure to the temperature $T_2$, white, opaque features continue to form closer to the outer regions of the gel monolith. Eventually, once the gel monolith is substantially dried, the whole gel monolith has a white, opaque appearance. In the preferred process, the gel monolith exhibits this white, opaque appearance after a second stage of liquid removal 220 of approximately 3 to 20 days.

The second stage of liquid removal 220 of the preferred process also comprises a relatively brief exposure of the gel monolith to high temperatures once the gel monolith is dried, i.e., liquid has been completely driven from the pores of the gel monolith. This period of heightened temperatures is used to drive the remaining vapor from the pores of the gel monolith. In the preferred process, the temperature is ramped up from $T_2$ to approximately 180° C. over a period of approximately 16 hours, and is held at this heightened temperature for approximately 3 to 10 hours. In addition, to facilitate the removal of vapor from the pores of the gel monolith, the preferred process comprises backfilling the oven with nitrogen or air at atmospheric pressure during this exposure to high temperatures.

After the gel monolith is dried as described above, it is then sintered 300 to further densify and form a glass-phase monolith. The glass phase is characterized by an amorphous structure. Alternatively, in other embodiments, the densification can result in a ceramic-phase monolith which has a crystalline structure. This sintering process results in further shrinkage of the monolith, eventually reaching approximately 60% (i.e., to 40% of its original size).

Figure 1:
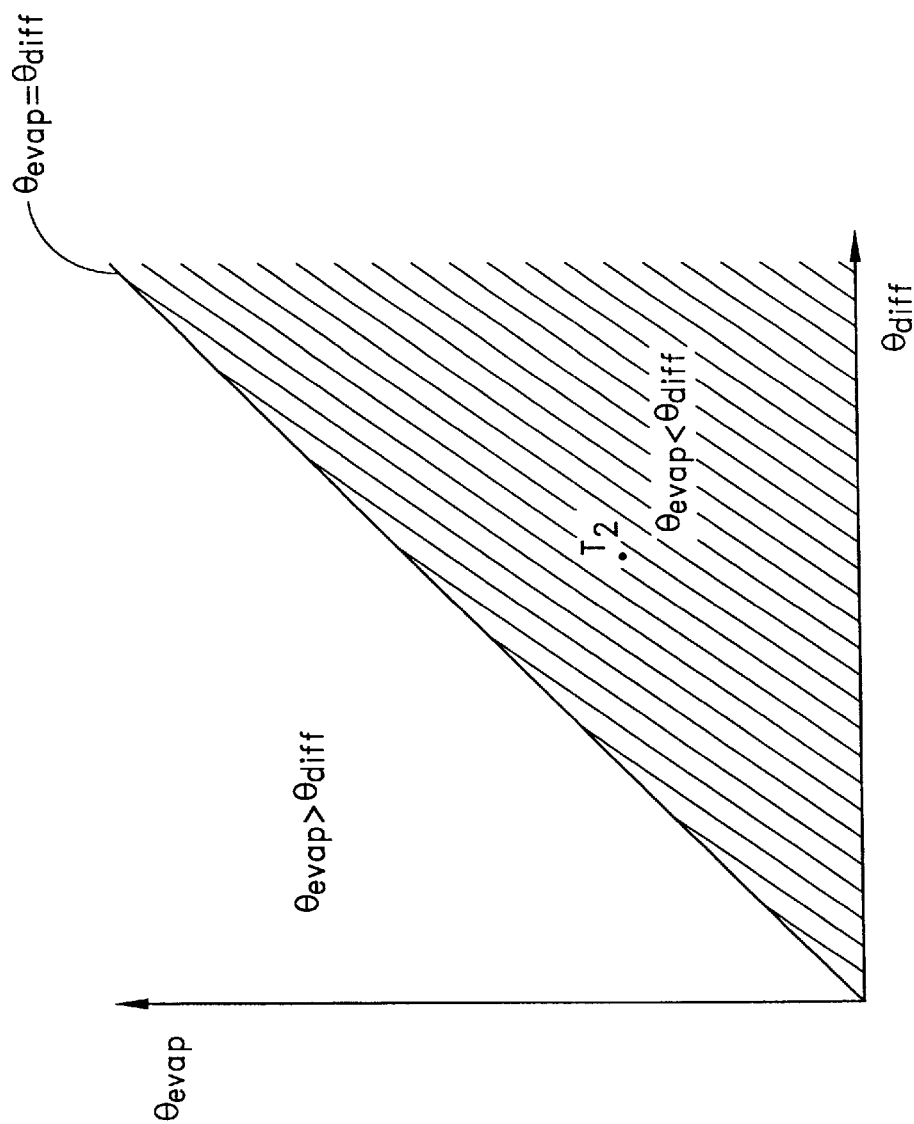
FIG. 1 is a graph illustrating the relation between the rate of evaporation $\theta_{evap}$ and the rate of diffusion $\theta_{diff}$ of liquid through the pores of a gel monolith in one embodiment of the present method.

While FIG. 3 illustrates a temporal temperature profile of an exemplary process, other temporal temperature profiles utilizing a value of $T_2$ within the hatched region of FIG. 1 to avoid cracks while drying the gel monolith are consistent with the present invention. For example, while the elevated temperature $T_1$ of the exemplary process of FIG. 3 is a constant, and the temperature adjustments are linear, processes utilizing variable elevated temperatures $T_1$ or non-linear temperature adjustments are within the scope of the present invention. Similarly, the temperature $T_1$ need not be higher than the temperature $T_2$ to practice the present invention.

The following discussion provides an example of sol-gel processing involving certain inventive aspects set forth herein. In this exemplary process, a sol-gel monolith was formed from a solution of TEOS, deionized water, hydrofluoric acid, and ethanol. After stirring the solution for approximately 3 to 5 minutes, it was poured into a mold and left to gel. The gel monolith was formed in less than one hour and was then transferred to a storage area and held at room temperature.

Approximately after one day, the gel monolith with its pores filled with ethanol was removed from the mold and placed in a drying oven. The drying oven was completely sealed, except for a port and piping system which allowed hot ethanol vapor to escape from the drying oven, and to condense and be collected. Throughout the drying treatment, the atmosphere within the drying oven was substantially saturated with ethanol vapor, and was substantially free of water vapor.

The temperature within the drying oven was raised to 77° C. at a rate of 1.5° C./hour. Once the temperature reached 77° C., the temperature was further ramped up to 88° C. at a rate of 0.2° C./hour. During this time, the gel monolith shrank slowly and was clear and bluish in appearance. The gel monolith was held at 88° C., shrank in size, until reaching the selected gel density which corresponded to a linear gel shrinkage of approximately 22% of the gel monolith's original size. At this point, the temperature was lowered to 79.5° C. at a rate of 3° C./hour.

After maintaining the temperature at 79.5° C. for four days, the gel monolith began to exhibit the visual characteristics of a dry gel monolith. Tiny white features began to form in the inner region of the gel monolith. As the gel monolith dried further, both the number and size of the white features increased. At the same time, a thin white film was observed to cover the outer surface of the gel monolith.

After a total of 14 days at 79.5° C., the temperature was ramped to 80.1° C. over 72 hours at a 120 hour/° C. rate, then to 80.9° C. over 72 hours at a 90 hour/° C. rate. The temperature was further increased to 81.8° C. at a 60 hour/° C. rate, to 91.8° C. at a 1 hour/° C. rate, and to 180° C. at a 0.1 hour/° C. rate. As the gel monolith was dried at temperatures higher than 79.5° C., it continued to shrink until it reached the critical gel density, which corresponded to a linear gel shrinkage of approximately 24% of its original size.

Upon reaching 180° C., the drying chamber was purged with dry nitrogen. The gel monolith was held at 180° C. in the dry nitrogen atmosphere for 6 hours, then the drying oven was allowed to cool down. Once cooled to room temperature, the gel monolith was transferred to a sintering furnace to form a glass-phase monolith.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of processing an oxide-based gel monolith comprising pores filled with liquid, the method comprising:
   removing a portion of the liquid from the pores of the gel monolith, said removing comprising:
      increasing the temperature from an initial temperature to an elevated temperature range at or above the boiling temperature of the liquid;
      maintaining the temperature within the elevated temperature range for a period of time, thereby shrinking the volume of the gel monolith and increasing the density of the gel monolith by an amount corresponding to a linear gel shrinkage of between about 15% and 35%; and
      decreasing the temperature from the elevated temperature range to a lower temperature range substantially below the elevated temperature range, the lower temperature range being above about 10 degrees Celsius below the boiling temperature of the liquid in the pores of the gel monolith and corresponding to a liquid removal rate approximately equal to or less than a pore liquid diffusion rate; and subsequently removing substantially all of the remaining liquid from the pores of the gel monolith, said subsequently removing comprising maintaining the temperature within the lower temperature range for a second period of time of approximately 3 to 20 days.

2. The method of claim 1, wherein said subsequently removing substantially all of the remaining liquid is performed at a constant rate.

3. The method of claim 2, wherein said removing a portion of the liquid comprises removing the liquid at a rate substantially higher than the rate of said subsequently removing.

4. The method of claim 1, wherein the rate of temperature increase from the initial temperature to the elevated temperature range is between about 0.2 and 10° C./hour.

5. The method of claim 1, wherein the rate of temperature increase from the initial temperature to the elevated temperature range is between about 0.5 and 5° C./hour.

6. The method of claim 1, wherein the rate of temperature increase from the initial temperature to the elevated temperature range is between about 0.5 and 1.5° C./hour.

7. The method of claim 1, wherein the elevated temperature range is between about 0° C. and 20° C. above the boiling temperature of the liquid in the pores of the gel monolith.

8. The method of claim 1, wherein the elevated temperature range is between about 3° C. and 15° C. above the boiling temperature of the liquid in the pores of the gel monolith.

9. The method of claim 1, wherein the elevated temperature range is between about 5° C. and 10° C. above the boiling temperature of the liquid in the pores of the gel monolith.

10. The method of claim 1, wherein the rate of temperature decrease from the elevated temperature range to the lower temperature range is between about 1 and 10° C./hour.

11. The method of claim 1, wherein the rate of temperature decrease from the elevated temperature range to the lower temperature range is between about 2 and 8° C./hour.

12. The method of claim 1, wherein the rate of temperature decrease from the elevated temperature range to the lower temperature range is between about 3 and 6° C./hour.

13. The method of claim 1, wherein the lower temperature range is between about 10° C. below and 10° C. above the boiling temperature of the liquid in the pores of the gel monolith.

14. The method of claim 1, wherein the lower temperature range is between about 5° C. below and 5° C. above the boiling temperature of the liquid in the pores of the gel monolith.

15. The method of claim 1, wherein the lower temperature range is between about 0° C. and 2° C. above the boiling temperature of the liquid in the pores of the gel monolith.

16. The method of claim 1, comprising initiating said subsequently removing substantially all the remaining liquid before the wet porous gel monolith has densified to substantially its critical gel density.

17. The method of claim 1, comprising initiating said subsequently removing substantially all the remaining liquid before the outer region of the gel monolith exhibits white, opaque features.

18. The method of claim 1, comprising initiating said subsequently removing substantially all the remaining liquid when the gel monolith linear shrinkage is between about 20% and 30%.

19. The method of claim 1, comprising initiating said subsequently removing substantially all the remaining liquid when the gel monolith linear shrinkage is between about 22% and 27%.

20. The method of claim 1, comprising initiating said subsequently removing substantially all the remaining liquid when the gel monolith pore radius size is between about 20 and 800 Å.

21. The method of claim 1, comprising initiating said sulsequetiy removing substantially all the remaining liquid when the gel monolith pore radius size is between about 100 and 800 Å.

22. The method of claim 1, comprising initiating said subsequently removing substantially all the remaining liquid when the gel monolith pore radius size is between about 200 and 800 Å.

23. The method of claim 1, comprising initiating said subsequently removing substantially all the remaining liquid when the weight of the liquid removed from the gel monolith is between about 40% and 55% of the original weight of the gel monolith.

24. The method of claim 1, comprising initiating said subsequently removing substantially all the remaining liquid when the weight of the liquid removed from the gel monolith is between about 40% and 50% of the original weight of the gel monolith.

25. The method of claim 1, comprising initiating said subsequently removing substantially ail the remaining liquid when the weight of the liquid removed from the gel monolith is between about 44% and 50% of the original weight of the gel monolith.

26. The method of claim 1, wherein said subsequently removing substantially all the remaining liquid comprises raising the temperature at a predetermined rate of increase.

27. The method of claim 26, wherein the rate of increase is sufficiently slow to substantially avoid cracking of the gel monolith.

28. The method of claim 27, wherein the rate of increase is between about 0.3 and 20 days/° C.

29. The method of claim 27, wherein the rate of increase is between about 1 and 10 days/° C.

30. The method of claim 27, wherein the rate of increase is between about 2 and 5 days/° C.

31. The method of claim 1, further comprising removing liquid from the pores of the gel monolith while the inner region exhibits white, opaque features before the outer region exhibits white, opaque features.

* * * * *

UNITED STATES PATENT AND TRADEMARK OFFICE
CERTIFICATE OF CORRECTION

PATENT NO. : 6,620,368 B1
DATED : September 16, 2003
INVENTOR(S) : Shi-Ho Wang et al.

It is certified that error appears in the above-identified patent and that said Letters Patent is hereby corrected as shown below:

Column 10,
Line 48, delete "sulsequetiy" and insert the word -- subsequently. --

Signed and Sealed this

Twenty-seventh Day of July, 2004

JON W. DUDAS
*Acting Director of the United States Patent and Trademark Office*